US012803989B2

(12) United States Patent
Ryu et al.

(10) Patent No.: US 12,803,989 B2
(45) Date of Patent: Nov. 17, 2026

(54) SYSTEM FOR CONTROLLING ROBOT AND METHOD THEREOF

(71) Applicants: Hyundai Motor Company, Seoul (KR); Kia Corporation, Seoul (KR)

(72) Inventors: Jung Min Ryu, Whasung-Si (KR); Seok Won Kim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 190 days.

(21) Appl. No.: 18/742,437

(22) Filed: Jun. 13, 2024

(65) Prior Publication Data

US 2025/0187196 A1 Jun. 12, 2025

(30) Foreign Application Priority Data

Dec. 11, 2023 (KR) ........................ 10-2023-0179089

(51) Int. Cl.
*H04L 9/40* (2022.01)
*B25J 9/16* (2006.01)

(52) U.S. Cl.
CPC ............ *H04L 63/12* (2013.01); *B25J 9/1689* (2013.01)

(58) Field of Classification Search
CPC ................................ H04L 63/12; B25J 9/1689
See application file for complete search history.

(56) References Cited

U.S. PATENT DOCUMENTS 9,449,294 B2 9/2016 Hwang et al.
11,128,478 B2 9/2021 Galdo et al.
11,609,916 B1 * 3/2023 Roy .................. G06F 16/24569
11,763,115 B1 * 9/2023 Agrawal ................ G06K 1/121 235/462.1
11,888,594 B2 1/2024 Galdo et al.
2006/0149824 A1 * 7/2006 Park ...................... H04L 67/125 709/206
2012/0199647 A1 8/2012 Hwang et al.
2017/0006471 A1 * 1/2017 Kim ...................... H04W 12/06
2017/0012964 A1 * 1/2017 Ceppi ................. H04L 63/0807
2017/0223005 A1 8/2017 Birgisson et al.
2017/0320215 A1 * 11/2017 Strandberg ............ H04W 12/04
2018/0241938 A1 * 8/2018 Buibas ................. H04N 13/243
2019/0072950 A1 * 3/2019 Clark ...................... H04L 63/08
2020/0029774 A1 * 1/2020 Mellinger, III ..... A47L 11/4061
2020/0127866 A1 * 4/2020 Lee ....................... H04W 12/77
2022/0035903 A1 * 2/2022 Kim ....................... B25J 9/1656
2022/0203539 A1 * 6/2022 Touma ................... B25J 13/006
2022/0287531 A1 * 9/2022 Ng ........................ A47L 9/2894
2022/0294843 A1 * 9/2022 Kim ...................... H04L 67/025
2022/0309133 A1 * 9/2022 Hinohara ............... H04N 7/181
2024/0356910 A1 * 10/2024 Kim ...................... H04L 63/083
2024/0375279 A1 * 11/2024 Tsai ..................... G06N 3/0464

FOREIGN PATENT DOCUMENTS

KR 10-1993239 B1 6/2019
KR 10-2399582 B1 5/2022

* cited by examiner

*Primary Examiner* — Michael Pyzocha
(74) *Attorney, Agent, or Firm* — MORGAN, LEWIS & BOCKIUS LLP

(57) ABSTRACT

A system for controlling a robot and a method thereof include a robot control server, and a robot, wherein the robot control server may receive a request for issuance of a target code related to access authority to the robot from a user operating the robot, and wherein the robot may identify the target code input by the user, and receive a command from the user based on validity of the target code being verified.

20 Claims, 9 Drawing Sheets

SYSTEM FOR CONTROLLING ROBOT AND METHOD THEREOF

CROSS-REFERENCE TO RELATED APPLICATION

The present application claims priority to Korean Patent Application No. 10-2023-0179089, filed on Dec. 11, 2023, the entire contents of which is incorporated herein for all purposes by this reference.

BACKGROUND OF THE PRESENT DISCLOSURE

Field of the Present Disclosure

The present disclosure relates to a system for controlling a robot and a method thereof, and more particularly, to technology for license registration, issuance, and authentication of robot as a service (RAAS).

Description of Related Art

Robot as a service (RAAS) is provided with a robot and a cloud solution that controls and manages the robot. In the instant case, a purchaser of RAAS utilizes the functions provided by a manufacturer depending on the purchase and service usage amount. For example, the manufacturer may issue licenses divided by function and period to users (purchasers), and the users with such licenses may use the robot hardware and the control, monitoring, management, and software functions provided together with the robot. Such licenses are issued through digital licenses.

License management and registration may protect the intellectual property and technology of a robot and prevent illegal copying and theft. Through license registration, transparency and safety of robot use may be guaranteed. In particular, license management and registration enable procedures necessary for maintenance and repair work, such as updating software or replacing hardware while the robot is in use.

RAAS providers have provided robot management cloud services and robot sales simultaneously, and have previously used different authentication and license management schemes for each robot business. Therefore, it is necessary to manage online services (indoor and outdoor delivery, patrol, and the like) and closed network (offline) services (factory logistics, patrol, public institutions) with the same issued license. In addition, depending on a network environment, license authentication is required to operate the robot for services in an offline environment. Accordingly, it is necessary to develop a technology that provides a scheme of registration using a tool such as a 2D code through a camera built into the robot and enables registration more easily and rapidly than existing schemes.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system for controlling a robot configured for increasing work efficiency according to the method and configuration of issuing and managing a target code such as a digital license for the robot online by managing a request for issuance of the target code related to access right to the robot from a user operating the robot, and a method thereof.

Another aspect of the present disclosure provides a system for controlling a robot configured for ensuring stability in the use of the robot according to a symmetric key issuance scheme and an encryption scheme of a target code by generating the target code through a payload containing the characteristics of the robot and a pre-stored symmetric key, and a method thereof.

Yet another aspect of the present disclosure provides a system for controlling a robot configured for managing not only a robot that is configured to perform an online service but also a robot that is configured to perform a closed-network service with the same target code by performing an operation to verify the validity of the target code differently depending on the connection state between a robot control server and the robot, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for controlling a robot includes a robot control server, and the robot, wherein the robot control server may receive a request for issuance of a target code related to access authority to the robot from a user operating the robot, and wherein the robot may identify the target code input by the user, and receive a command from the user based on validity of the target code being verified.

According to an exemplary embodiment of the present disclosure, the robot control server may transmit the issuance request to a manager who manages the robot control server based on the issuance request being received from the user, and generate the target code based on receiving an approval command regarding the issuance request from the manager.

According to an exemplary embodiment of the present disclosure, the robot control server may be configured to generate a first payload based on at least one of serial code information of the robot, media access control address (MAC address) information of the robot, information related to an operation expiration period of the robot, information related to a model name of the robot, or information related to a providing function of the robot, or a combination thereof based on receiving the approval command, and generate the target code based on the first payload and a first symmetric key stored in the robot control server.

According to an exemplary embodiment of the present disclosure, the robot control server may transmit the first payload and a signature based on receiving a login request from the robot.

According to an exemplary embodiment of the present disclosure, the robot control server may transmit the target code to the user based on a connection between the robot and the robot control server being in a first state corresponding to online, and transmit the target code and a first sub-code including the first payload to the user based on a connection between the robot and the robot control server being in a second state corresponding to offline.

According to an exemplary embodiment of the present disclosure, the robot control server may update information which is different from information related to the robot among information included in the first payload based on the connection between the robot and the robot control server being in the first state.

According to an exemplary embodiment of the present disclosure, the robot may identify a second symmetric key from the target code based on receiving the target code from the user through an input device of the robot, determine a connection state between the robot control server and the robot based on identification of the second symmetric key, and verify the validity of the target code based on determination of the connection state.

According to an exemplary embodiment of the present disclosure, the robot may transmit a login request based on at least one of a serial code of the robot, a MAC address of the robot, or a combination thereof is sent to the robot control server, based on the connection between the robot and the robot control server being online, receive a second payload including a signature from the robot control server, apply the second symmetric key to the second payload to decrypt the second payload, and verify the validity of the target code by identifying at least one of the serial code of the robot, the MAC address of the robot, an operation expiration period of the robot, a model name of the robot, or a provided function of the robot, or a combination thereof from the decrypted second payload.

According to an exemplary embodiment of the present disclosure, the robot may request the user to input a second sub-code from the user based on the connection between the robot and the robot control server being offline, decrypt the second sub-code by applying the second symmetric key to the second sub-code based on receiving the second sub-code from the user through the input device of the robot, and verify the validity of the target code by identifying at least one of a serial code of the robot, a MAC address of the robot, an operation expiration period of the robot, a model name of the robot, or a provided function of the robot, or a combination thereof from the decrypted second sub-code.

According to an exemplary embodiment of the present disclosure, the robot may apply a state of the robot as a failure state based on verification of the validity of the target code failing, and transmit the state of the robot to the user.

According to an aspect of the present disclosure, a method of controlling a robot includes receiving a request for issuance of a target code related to access authority to the robot from a user operating the robot, identifying the target code input by the user, and receiving a command from the user based on validity of the target code being verified.

According to an exemplary embodiment of the present disclosure, the receiving of the request for issuance of the target code may include transmitting the issuance request to a manager who manages the robot control server based on the issuance request being received from the user, and generating the target code based on receiving an approval command regarding the issuance request from the manager.

According to an exemplary embodiment of the present disclosure, the generating of the target code may include generating a first payload based on at least one of serial code information of the robot, media access control address (MAC address) information of the robot, information related to an operation expiration period of the robot, information related to a model name of the robot, or information related to a providing function of the robot, or a combination thereof based on receiving the approval command, and generating the target code based on the first payload and a first symmetric key stored in the robot control server.

According to an exemplary embodiment of the present disclosure, the generating of the target code may include transmitting the first payload and a signature based on receiving a login request from the robot.

According to an exemplary embodiment of the present disclosure, the generating of the target code may include transmitting the target code to the user based on a connection between the robot and the robot control server being in a first state corresponding to online, and transmitting the target code and a first sub-code including the first payload to the user based on a connection between the robot and the robot control server being in a second state corresponding to offline.

According to an exemplary embodiment of the present disclosure, the method may further include updating information which is different from information related to the robot among information included in the first payload based on the connection between the robot and the robot control server being in the first state.

According to an exemplary embodiment of the present disclosure, the method may further include identifying a second symmetric key from the target code based on receiving the target code from the user through an input device of the robot, determining a connection state between the robot control server and the robot based on identification of the second symmetric key, and verifying the validity of the target code based on determination of the connection state.

According to an exemplary embodiment of the present disclosure, the verifying of the validity of the target code may include transmitting a login request based on at least one of a serial code of the robot, or a MAC address of the robot, or a combination thereof to the robot control server, based on the connection between the robot and the robot control server being online, receiving a second payload including a signature from the robot control server, applying the second symmetric key to the second payload to decrypt the second payload, and verifying the validity of the target code by identifying at least one of the serial code of the robot, the MAC address of the robot, an operation expiration period of the robot, a model name of the robot, or a provided function of the robot, or a combination thereof from the decrypted second payload.

According to an exemplary embodiment of the present disclosure, the verifying of the validity of the target code may include requesting the user to input a second sub-code from the user based on the connection between the robot and the robot control server being offline, decrypting the second sub-code by applying the second symmetric key to the second sub-code based on receiving the second sub-code from the user through the input device of the robot, and verifying the validity of the target code by identifying at least one of a serial code of the robot, a MAC address of the robot, an operation expiration period of the robot, a model name of the robot, or a provided function of the robot, or a combination thereof from the decrypted second sub-code.

According to an exemplary embodiment of the present disclosure, the method may further include applying a state of the robot as a failure state based on verification of the validity of the target code failing, and transmitting the state of the robot to the user.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
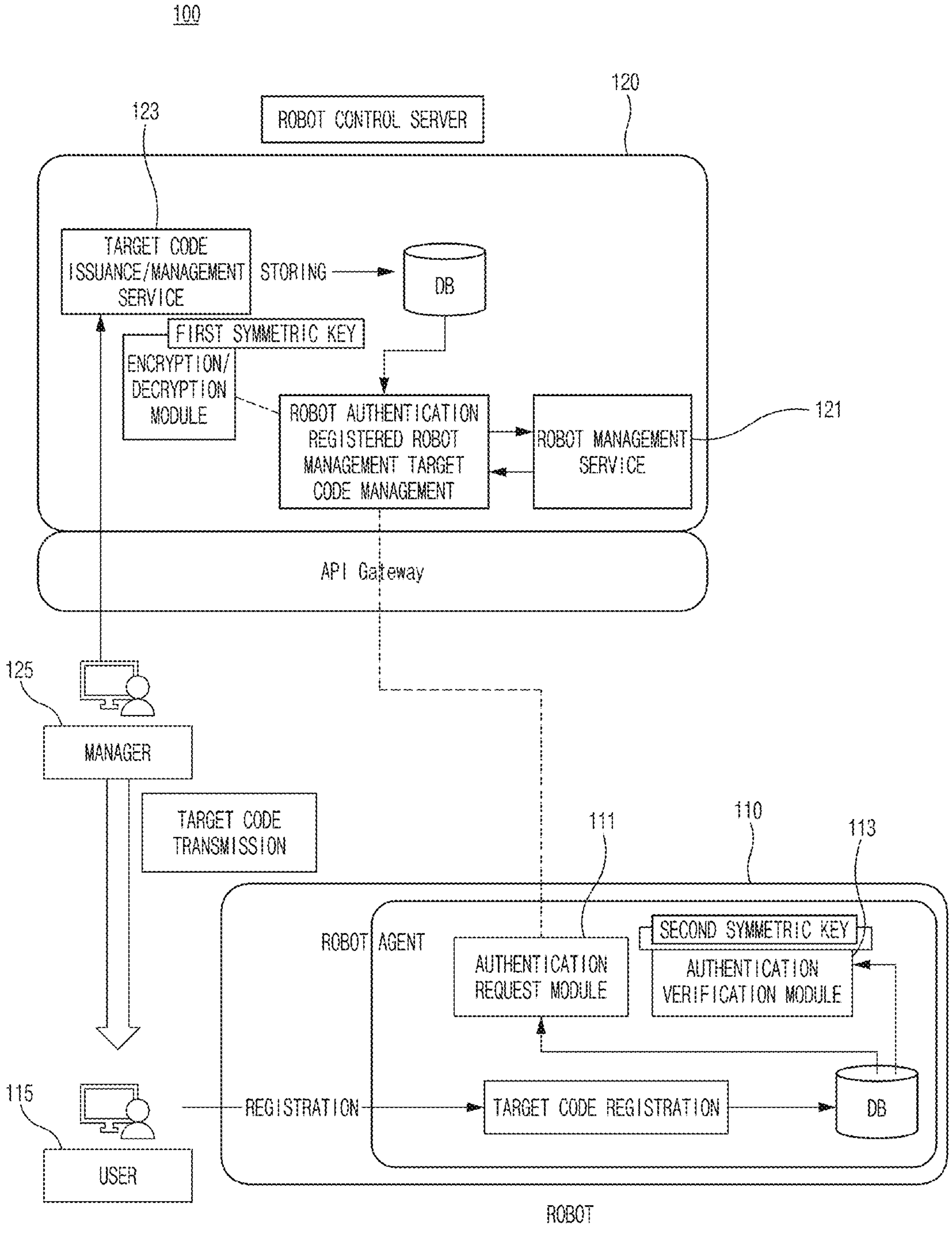
FIG. 1 is a diagram illustrating a system for controlling a robot according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure. Various embodiments of the present disclosure may be described with reference to accompanying drawings. Accordingly, those of ordinary skill in the art will recognize that modification, equivalent, and/or alternative on the various embodiments described herein may be variously made without departing from the scope and spirit of the present disclosure. With regard to description of drawings, similar elements may be marked by similar reference numerals.

Terms, such as first, second, A, B, (a), (b) or the like may be used herein when describing components of the present disclosure. The terms are provided only to distinguish the elements from other elements, and the essences, sequences, orders, and numbers of the elements are not limited by the terms. Furthermore, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure. The terms, such as “first”, “second”, and the like used herein may refer to various elements of various embodiments of the present disclosure, but do not limit the elements. For example, “a first user device” and “a second user device” indicate different user devices regardless of the order or priority. For example, without departing the scope of the present disclosure, a first element may be referred to as a second element, and similarly, a second element may be referred to as a first element.

In the present disclosure included herein, the expressions “have”, “may have”, “include” and “comprise”, or “may include” and “may comprise” used herein indicate existence of corresponding features (e.g., elements such as numeric values, functions, operations, or components) but do not exclude presence of additional features.

It will be understood that when an element (e.g., a first element) is referred to as being “(operatively or communicatively) coupled with/to” or “connected to” another element (e.g., a second element), it may be directly coupled with/to or connected to the other element or an intervening element (e.g., a third element) may be present. In contrast, when an element (e.g., a first element) is referred to as being “directly coupled with/to” or “directly connected to” another element (e.g., a second element), it should be understood that there are no intervening element (e.g., a third element).

According to the situation, the expression “configured to” used herein may be used as, for example, the expression “suitable for”, “having the capacity to”, “designed to”, “adapted to”, “made to”, or “capable of”.

The term “configured to” must not mean only “specifically designed to” in hardware. Instead, the expression “a device configured to” may mean that the device is “capable of” operating together with another device or other components. CPU, for example, a “processor configured to perform A, B, and C” may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device. Terms used in the present disclosure are used to describe specified embodiments of the present disclosure and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein In various embodiments of the present disclosure. In some cases, even if terms are terms which are defined in an exemplary embodiment of the present disclosure, they may not be interpreted to exclude embodiments of the present disclosure.

In an exemplary embodiment of the present disclosure included herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Furthermore, as used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. A phrase such as "at least one of A, B, or C, or any combination thereof" may include A or B or C or any combination thereof such as AB or ABC.

Hereinafter, various exemplary embodiments of the present disclosure will be described in detail with reference to FIG. 1, FIG. 2, FIG. 3, FIG. 4, FIG. 5, FIG. 6, FIG. 7, FIG. 8 and FIG. 9.

FIG. 1 is a diagram illustrating a system for controlling a robot according to an exemplary embodiment of the present disclosure.

A system 100 for controlling a robot according to various exemplary embodiments of the present disclosure may include a robot 110 and a robot control server 120.

The robot 110 may include a robot agent. For example, the robot agent may include an authentication request module 111, an authentication verification module 113, and a database (DB). The robot 110 may include a robot that autonomously moves in an area to be driven without user manipulation and performs the task of a command received from the user. In detail, the robot 110 may include a cleaning robot, a telepresence robot, a security robot, a surgical robot, a housekeeper robot, a service robot for public places, an aerospace remote robot, a hazardous materials disposal robot, and the like, but the exemplary embodiment of the present disclosure is not limited thereto. Such a robot may perform tasks by use of a driving device which is designed to move like a user's arm or hand using electrical or mechanical mechanisms.

The robot 110 may communicate with the robot control server 120. For example, the robot 110 may transmit and receive data through a communication device when the connection between the robot 110 and the robot control server 120 is online. In detail, the communication device of the robot 110 may support communication between the robot 110 and the robot control server 120. For example, the communication device may include one or more components that enable communication between the robot 110 and the robot control server 120. For example, the communication device may include a short range wireless communication device, a microphone, and the like. In the instant case, a short-range communication technology may include wireless LAN (Wi-Fi), Bluetooth, ZigBee, Wi-Fi direct (WFD), ultra-wideband (UWB), infrared data association (IrDA), Bluetooth low energy (BLE), Near Field Communication (NFC), and the like, but the exemplary embodiment of the present disclosure is not limited thereto.

The robot 110 may verify the validity of the target code input from a user 115 through a service provided by a robot agent within the robot. For example, when a target code is input from the user 115, the robot 110 may verify the validity by interpreting the 2D code of the target code. The robot 110 may store the validated target code in a DB within the robot. Details of the 2D code will be described with reference to FIG. 8 below.

The target code may represent a license that allows the user 115 to use the robot 110. For example, the target code may be issued by a manager 125 of the robot control server 120. The user 115 may receive an email, text message, an inquiry to the robot control server 120, or a target code from the robot 110. The user 115 may use the robot 110 through the issued target code. In detail, the target code may include a code encrypted with a symmetric key to enhance security when issuing a license for the robot 110. Such a code may typically be expressed in a form such as a quick response (QR) code. Therefore, in the present specification, for convenience of explanation, the target code is mainly described as a QR code or 2D code. Furthermore, the target code is not limited thereto and may be a general character string, a graphical user interface (GUI), or a command line interface (CLI).

The symmetric key may represent a key needed to encrypt a license to use the robot 110. For example, the symmetric key may be stored in the robot 110 and the robot control server 120, respectively. In detail, the robot control server 120 may store a first symmetric key. The robot 110 may store a second symmetric key. The first symmetric key may include the same information as the second symmetric key. That is, the symmetric key containing the same information may be referred to as the first symmetric key when stored in the robot control server 120. To the contrary, when stored in the robot 110, the symmetric key may be referred to as the second symmetric key. For example, the target code may represent a license encrypted in HS256 or RS256, together with the first symmetric key and/or the second symmetric key.

The authentication request module 111 may be a module that performs a login request when the robot 110 logs in to the robot control server 120. For example, when the connection between the robot 110 and the robot control server 120 is online (e.g., the first state), the authentication request module 111 of the robot 110 may query the authentication information and target code stored in the DB within the robot to perform a login request to the robot control server 120. For reference, the authentication information may include serial code information, media access control address (MAC) information, a model name, a secret key, and an application programming interface (API) key.

The authentication verification module 113 may be a module that verifies the target code within the robot 110 when the robot 110 is in a closed network service or offline. For example, when the connection between the robot 110 and the robot control server 120 is offline (e.g., the second state), the authentication verification module 113 of the robot 110 may independently verify the target code input from the user 115.

The robot control server 120 may include an encryption and decryption module, a robot management service 121, and a target code issuance and management service 123. For example, the encryption and decryption module may be a module that encrypts and decrypts authentication information (e.g., serial code information) included in the target code when issuing the target code. The encryption and decryption module may perform encryption of authentication information and decryption of the target code, and store the results in the DB.

The robot management service 121 may represent a service that stores and manages authentication information of a robot (e.g., the robot 110) which is the subject of management. In additionally, the target code issuance and management service 123 may be linked with the DB to issue and manage the target code.

Figure 2:
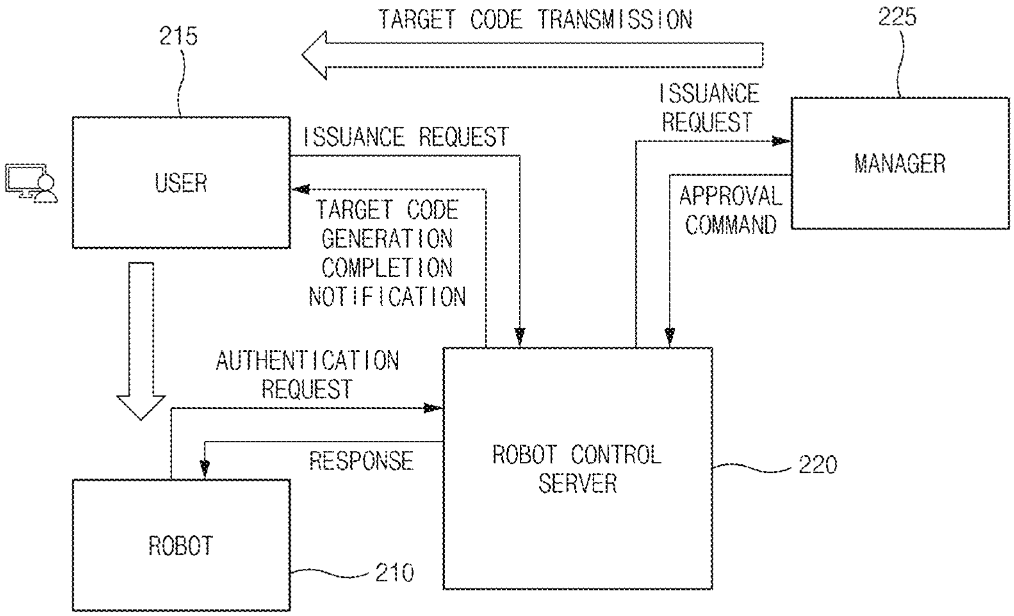
FIG. 2 is a diagram illustrating the connection relationship between a robot and a robot control server in a system for controlling a robot according to an exemplary embodiment of the present disclosure.

FIG. 2 is a diagram illustrating the connection relationship between a robot and a robot control server in a system for controlling a robot according to an exemplary embodiment of the present disclosure.

A system for controlling a robot (e.g., the system 100 for controlling a robot of FIG. 1) according to various exemplary embodiments of the present disclosure may include a robot 210 and a robot control server 220. For example, the robot 210 may identify the target code input from a user 215. The robot 210 may receive a command from the user 215 based on the validity of the target code being verified. The robot control server 220 may receive a request for issuance of the target code regarding access authority to the robot 210 from the user 215 who operates the robot. For reference, the user 215 who operates the robot may be the person who purchased the robot 210, but the exemplary embodiment of the present disclosure is not limited thereto. For example, the user 215 who operates the robot may be the same person as a manager 225 who approves the request for issuance of the target code. Accordingly, the request for issuance of the target code may be generated by the user 215 who operates the robot or the manager 225 who manages the robot.

For example, the user 215 may request the robot control server 220 to issue the target code. The robot control server 220 may receive the issuance request from the user 215. The robot control server 220 may transmit the received issuance request to the manager 225. The manager 225 may transmit an approval command regarding the issuance request received from the robot control server 220. The robot control server 220 may transmit a generation completion notification of the target code to the user 215 based on receiving an approval command from the manager 225. The user 215 may receive the target code from the manager 225 based on receiving the generation completion notification of the target code. For reference, in the present specification, for convenience of explanation, the user 215 receiving the target code from the manager 225 may be the same as the user 215 receiving the target code from the robot control server 220.

The user 215 may input the target code into the robot 210 based on receiving the target code. The robot 210 may transmit an authentication request to the robot control server 220 based on receiving the target code. In the instant case, the authentication request may represent an authentication request regarding validation of the target code input and/or received from the user 215. The robot 210 may receive a command from the user 215 based on the validity of the target code being verified.

Figure 3:
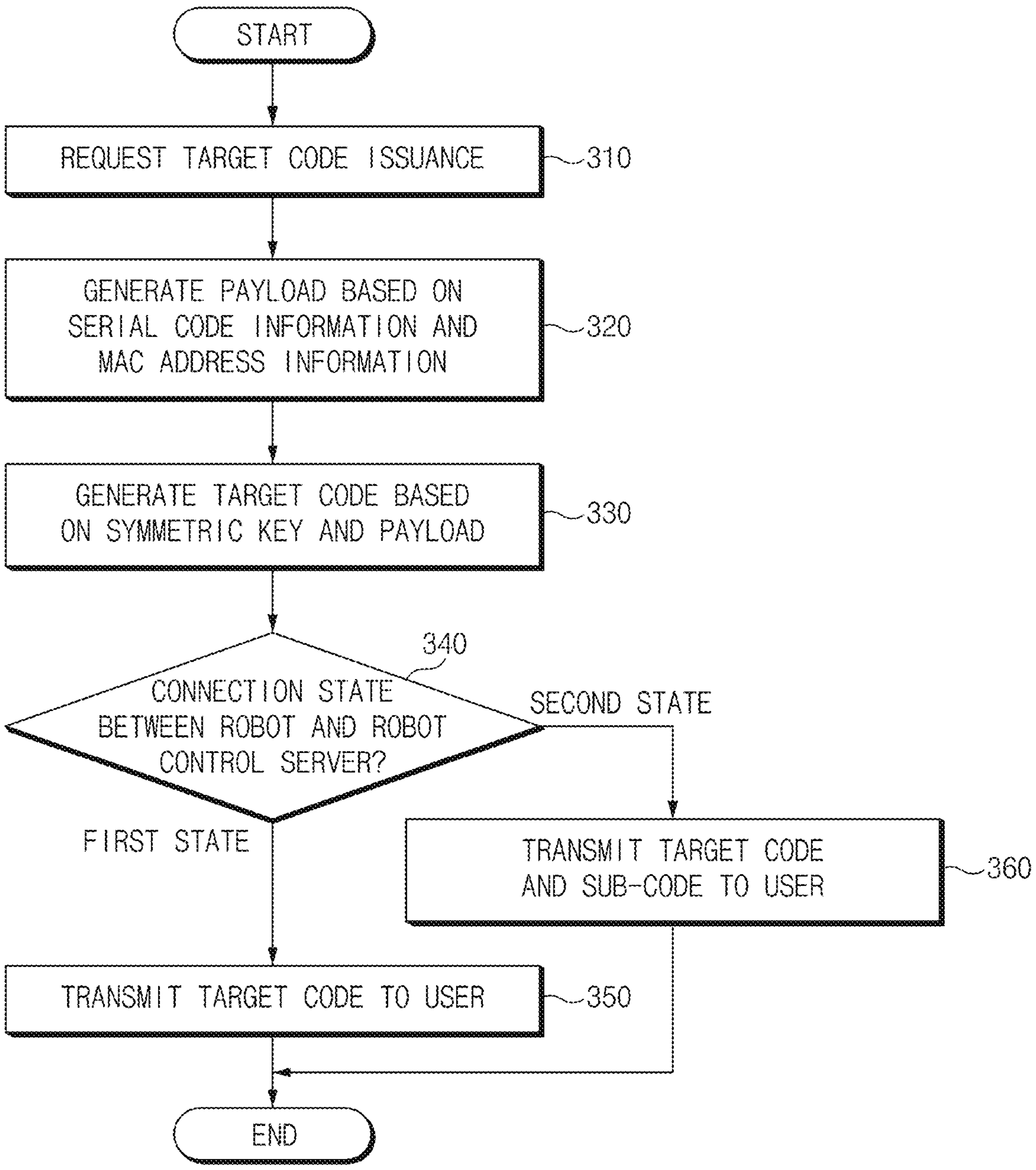
FIG. 3 is a flowchart illustrating a method of generating a target code in a system for controlling a robot according to an exemplary embodiment of the present disclosure.

FIG. 3 is a flowchart illustrating a method of generating a target code in a system for controlling a robot according to an exemplary embodiment of the present disclosure.

In a system for controlling a robot (e.g., the system 100 for controlling a robot of FIG. 1) according to an exemplary embodiment of the present disclosure, in operation 310, a user may transmit a request for issuance of a target code to a robot control server.

In operation 320, the robot control server may be configured to generate a payload based on serial code information and MAC address information based on receiving the request for issuance of the target code. For example, the robot control server may transmit the issuance request to a manager who manages the robot control server based on receiving the issuance request from the user. At the same time, the robot control server may be configured to generate the payload for issuing and/or generating the target code.

In operation 330, the robot control server may be configured to generate the target code based on a symmetric key and the payload. In detail, the symmetric key may represent a symmetric key (e.g., the first symmetric key shown in FIG. 1) stored in the robot control server. The robot control server may be configured to generate the target code based on the symmetric key and the payload based on receiving an approval command regarding the issuance request from the manager.

Based on receiving the approval command, the robot control server may be configured to generate a first payload based on at least one of serial code information of the robot, media access control address (MAC address) information of the robot, information related to an operation expiration period of the robot, information related to a model name of the robot, or information related to a providing function of the robot, or any combination thereof. The details of the first payload will be described with reference to FIG. 8 below. The robot control server may be configured to generate the target code based on the first payload and the first symmetric key stored in the robot control server.

In operation 340, the robot control server may be configured to determine the connection state between the robot and the robot control server. For example, in a first state in which the connection between the robot and the robot control server is online, the robot control server may transmit the target code to the user through operation 350. In detail, the robot control server may transmit the target code to the user based on the first state corresponding to the connection between the robot and the robot control server being online.

In operation 360, based on a second state in which the connection between the robot and the robot control server is offline, the robot control server may transmit a first sub-code including the target code and the first payload to the user. In detail, the robot control server may transmit the target code to the user in the first state. To the contrary, the robot control server may transmit the target code and the sub-code to the user in the second state. The reasons for this are as follows. In the first state, the robot may transmit a login request to the robot control server. In the instant case, the robot may receive data such as the first payload from the robot control server. The robot control server may transmit the first payload and a signature based on receiving the login request from the robot. To the contrary, in the second state, the robot may not transmit the login request to the robot control server. Therefore, the robot needs to verify the target code and the sub-code input and/or received from the user by itself.

Figure 4:
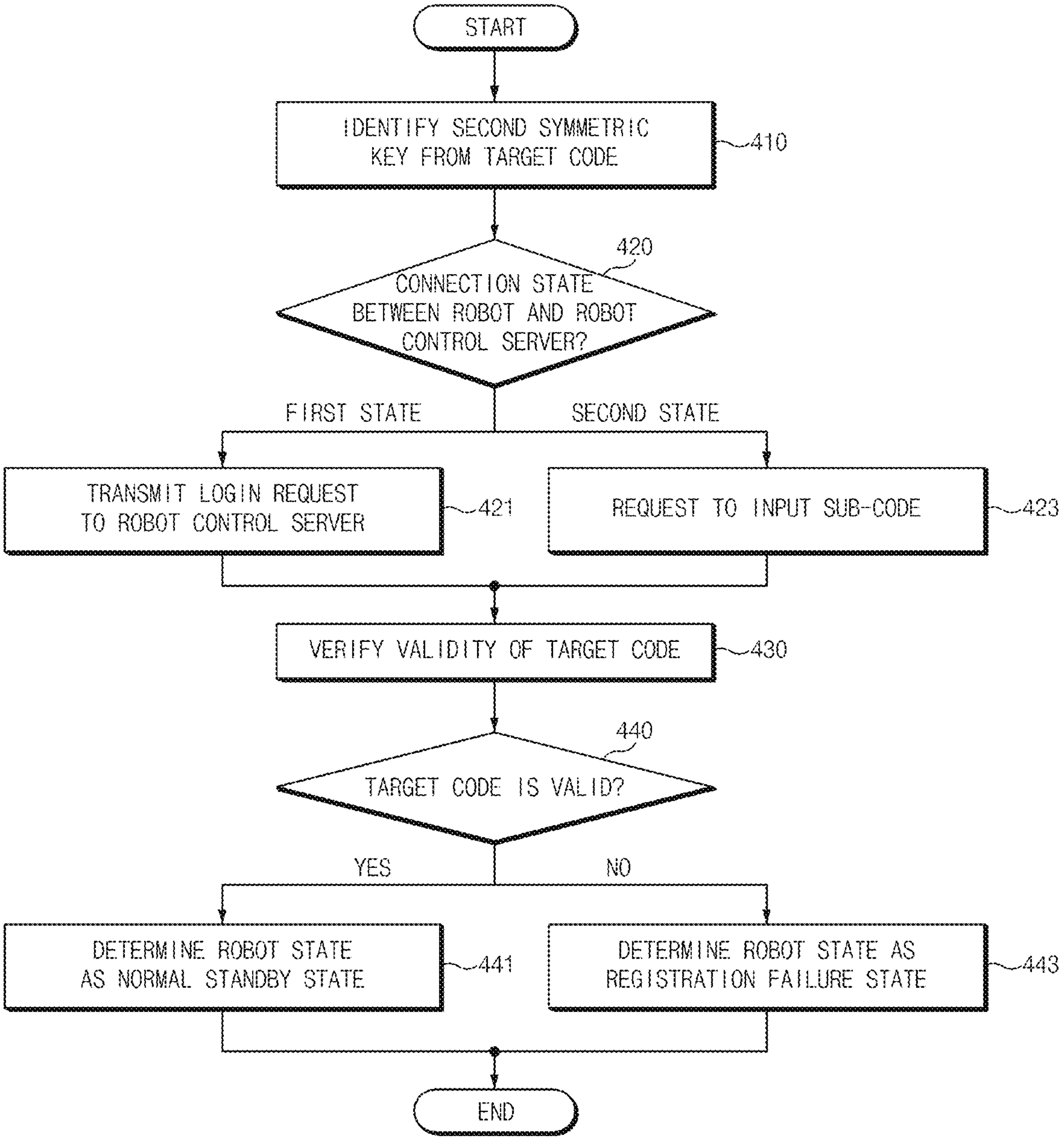
FIG. 4 is a flowchart illustrating a method of registering a target code to a robot in a system for controlling a robot according to an exemplary embodiment of the present disclosure.

FIG. 4 is a flowchart illustrating a method of registering a target code to a robot in a system for controlling a robot according to an exemplary embodiment of the present disclosure.

In a system for controlling a robot (e.g., the system 100 for controlling a robot of FIG. 1) according to an exemplary embodiment of the present disclosure, in operation 410, the robot may identify the second symmetric key from the target code based on receiving the target code from the user through the input device of the robot. In detail, the second symmetric key may represent the same symmetric key as the first symmetric key stored in the robot control server.

In operation 420, the robot may be configured to determine the connection state between the robot and the robot control server. In detail, the robot may be configured to determine the connection state between the robot control server and the robot based on the identification of the second symmetric key. Thereafter, the robot may perform operations of verifying the validity of the target code to be described below, based on the determined connection state. For example, in the first state, the robot may transmit a login request to the robot control server in operation 421. Alternatively, in the second state, the robot may request the user to input a sub-code in operation 423.

In operation 430, the robot may perform verify the validity of the target code input from the user. In operation 440, the robot may be configured to determine the validity of the target code for an object for which the validity of the target code is verified.

For example, the robot may transmit the login request based on at least one of the serial code of the robot, or the MAC address of the robot, or any combination thereof to the robot control server, based on the connection between the robot and the robot control server being online. In the instant case, the robot may receive the second payload including a signature from the robot control server. For reference, the robot control server may transmit the first payload including the signature to the robot. The robot may receive and simultaneously store the first payload including the signature from the robot control server. The first payload stored in the robot and including the signature may be the second payload including the signature. Through such operations, the robot may receive the second payload including the signature from the robot control server. The robot may apply the second symmetric key to the second payload to decrypt the second payload.

The robot may identify at least one of the serial code of the robot, the MAC address of the robot, the operation expiration period of the robot, the model name of the robot, or the provided function of the robot, or any combination thereof from the decrypted second payload, thereby verifying the validity of the target code.

For example, the robot may request the user to input a second sub-code based on the connection between the robot and the robot control server being offline. That is, in the second state in which the robot is offline, because the robot cannot receive the second payload from the robot control server, the robot may request the user to input the second sub-code. The robot may perform decryption of the second sub-code by applying the second symmetric key to the second sub-code based on receiving the second sub-code from the user through the input device of the robot.

The robot may identify at least one of the serial code of the robot, the MAC address of the robot, the operation expiration period of the robot, the model name of the robot, or the provided function of the robot, or any combination thereof from the decrypted second payload, thereby verifying the validity of the target code.

In operation 441, the robot may be configured to determine the state of the robot as a normal standby state based on the validity of the target code being verified. To the contrary, in operation 443, the robot may be configured to determine the state of the robot as a registration failure state based on the failure of validation of the target code. At the same time, the robot control server may apply the state of the robot as a failure state based on the failure of validation of the target code and transmit the state of the robot to the user.

Figure 5:
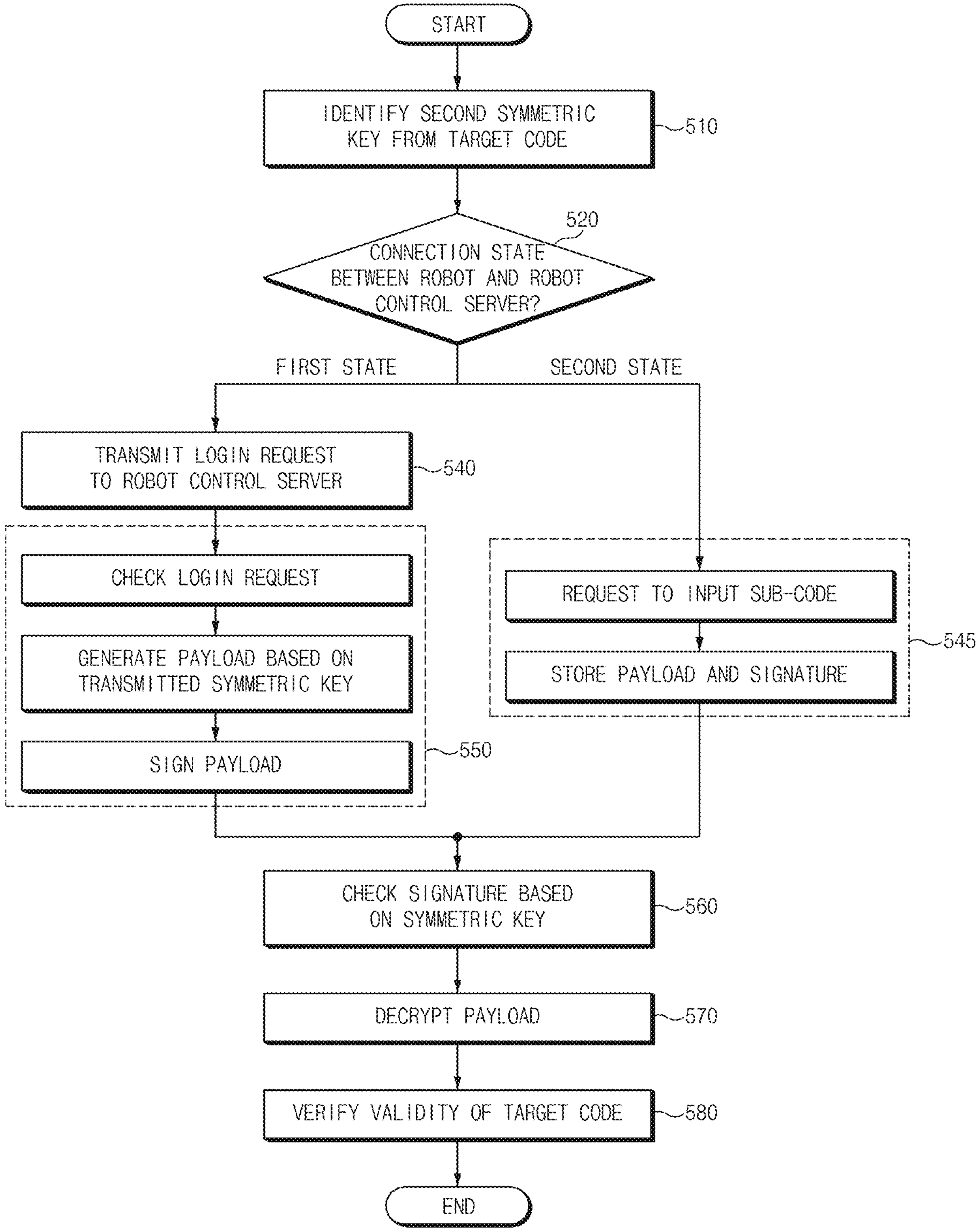
FIG. 5 is a flowchart illustrating a method of verifying the validity of a target code in a system for controlling a robot according to an exemplary embodiment of the present disclosure.

FIG. 5 is a flowchart illustrating a method of verifying the validity of a target code in a system for controlling a robot according to an exemplary embodiment of the present disclosure.

In a system for controlling a robot (e.g., the system 100 for controlling a robot of FIG. 1) according to an exemplary embodiment of the present disclosure, the robot may identify a symmetric key from the target code in operation 510. For example, the target code may be input or received from a user.

In operation 510, the robot may store the identified symmetric key in the DB. For example, the robot may identify the symmetric key from the target code and store the identified symmetric key in the DB through an authentication request module included in the robot. Furthermore, the robot may make a login request to the robot control server through the authentication request module included in the robot.

In operation 520, the robot may be configured to determine the connection state between the robot and the robot control server. In the instant case, when the connection state between the robot and the robot control server is online, the robot may transmit a login request to the robot control server in operation 540. To the contrary, when the connection state between the robot and the robot control server is offline, the robot may request the user to input a sub-code in operation 545. Furthermore, the robot may store the payload and signature based on the input sub-code.

In operation 550, the robot control server may confirm the login request transmitted from the robot. In detail, the robot control server may confirm the login request based on at least one of the serial code information of the robot, or the MAC address of the robot, or any combination thereof. The robot control server may be configured to generate a payload through the delivered symmetric key based on the login request being confirmed. In detail, the payload may include at least one of the operation expiration period required for robot management/operation, the serial code, MAC address, model name, operation expiration period, or the type of provided function of the robot, or any combination thereof. The payload may be stored in JavaScript object notation (JSON) format. The payload may be stored in the robot control server. The payload may be encrypted using a symmetric key when a login request is received from the robot. Accordingly, the robot control server may be configured to generate or encrypt the payload through the delivered symmetric key.

For reference, the types of provided functions may include at least one of whether a text-to-speech (TTS) function is provided, whether a function of releasing the maximum speed of the robot is provided, whether a robot ambient lighting function is provided, or whether a robot operation statistics function is provided, or any combination thereof. The details related to the payload will be described with reference to FIG. 8 below.

The robot control server may perform signature processing on the payload based on the payload being generated. Then, the robot control server may transmit the signed payload to the robot.

In operation 560, the robot may verify the signature of the signed payload based on the symmetric key. After verifying the signature, the robot may decrypt the payload received from the robot control server in operation 570.

In operation 580, the robot may verify the validity of the target code based on the decryption of the payload being performed. For example, the robot may verify the validity of the target code by checking whether the serial code information of the robot and the MAC address of the robot match. The robot may verify the validity of the target code by checking the expiration period of the target code.

Figure 6:
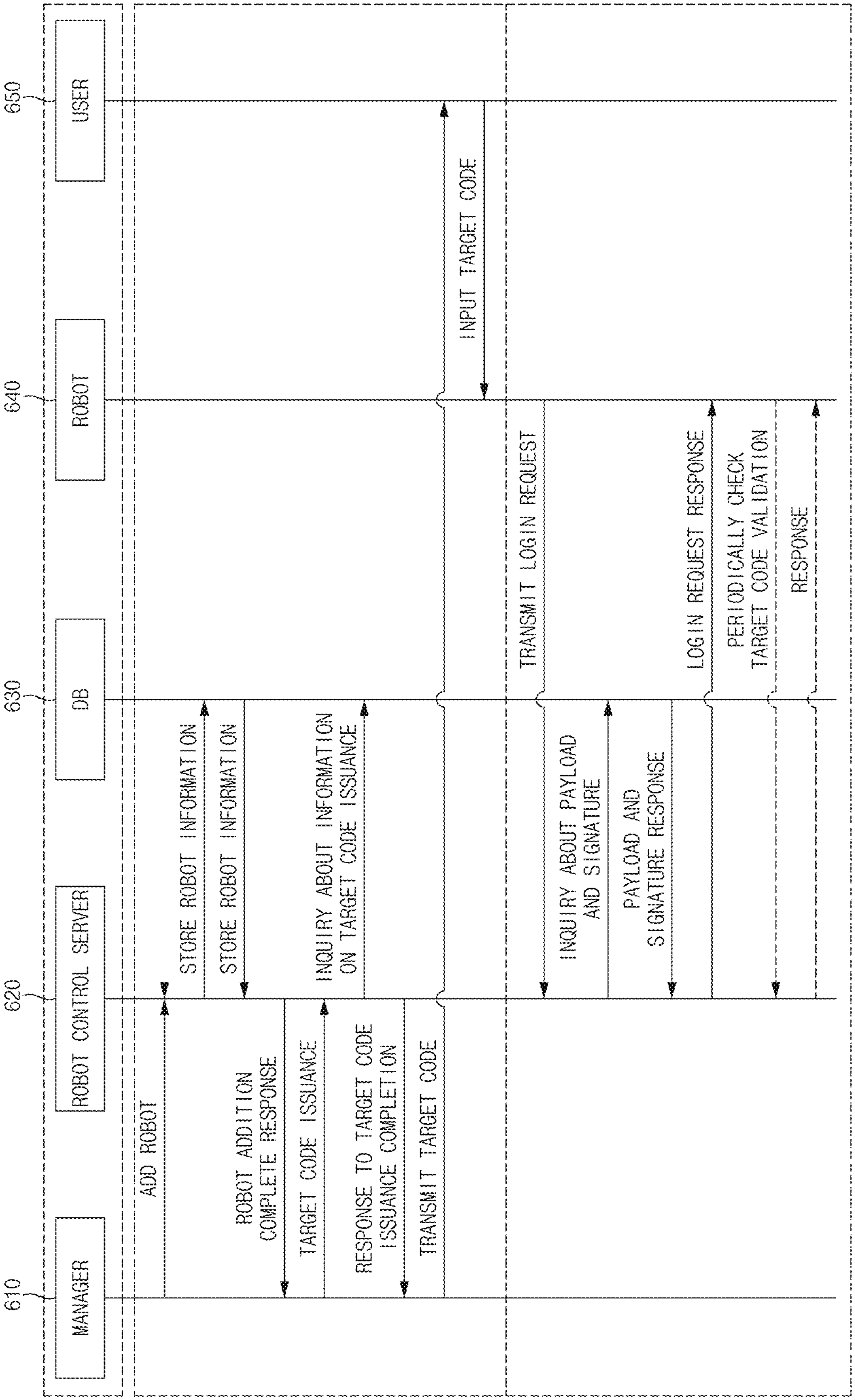
FIG. 6 is a diagram illustrating a method of generating a target code while the connection between a robot and a robot control server is online in a system for controlling a robot according to an exemplary embodiment of the present disclosure.

FIG. 6 is a diagram illustrating a method of generating a target code while the connection between a robot and a robot control server is online in a system for controlling a robot according to an exemplary embodiment of the present disclosure.

In a system for controlling a robot (e.g., the system 100 for controlling a robot of FIG. 1) according to an exemplary embodiment of the present disclosure, a manager 610 may add a robot to a robot control server 620. In the instant case, the manager 610 may register basic information such as serial code information of the robot and a MAC address of the robot in the robot control server 620.

The robot control server 620 may store the basic information received from the manager 610 in a DB 630. The robot control server 620 may transmit a response regarding completion of robot addition to the manager 610 based on stored robot information including the basic information.

Based on the addition of the robot, the manager 610 may request the robot control server 620 to issue the target code for the added robot (i.e., request issuance). The robot control server 620 may query information related to the target code issuance and generate the target code. Then, the robot control server 620 may transmit the target code to the manager 610.

A user 650 may input the target code into a robot 640 based on receiving the target code. In the instant case, the user 650 may receive the target code from the manager 610 through a tool such as email.

The robot 640 may perform the following operations based on receiving the target code from the user 650. For reference, the operations performed by the robot 640 below may be explained on the assumption that the connection state between the robot 640 and the robot control server 620 is online. Accordingly, when the connection state between the robot 640 and the robot control server 620 is offline, this will be described in detail in FIG. 7 below.

The robot 640 may transmit a login request to the robot control server 620. In the instant case, the robot 640 may transmit the login request to the robot control server 620 based on basic information such as serial code information of the robot and a MAC address of the robot.

The robot control server 620 may query the payload and signature stored in the DB 630 based on the login request being received, and generate the target code based on the payload and signature. As an exemplary embodiment of the present disclosure, the robot control server 620 may be configured to generate or encrypt the payload with the symmetric key in response to the login request.

The robot 640 may check the validity of the target code with the robot control server 620 at previously specified time intervals. In detail, the robot 640 may check the validity of the target code at previously specified time intervals by performing the same operation as performing the login request to the robot control server 620 based on the target code input from the user 650.

Based on the fact that the connection between the robot and the robot control server is in the first state (i.e., online state), the robot control server 620 may update information different from information (e.g., the basic information stored in the robot) about the robot among information included in the payload.

Figure 7:
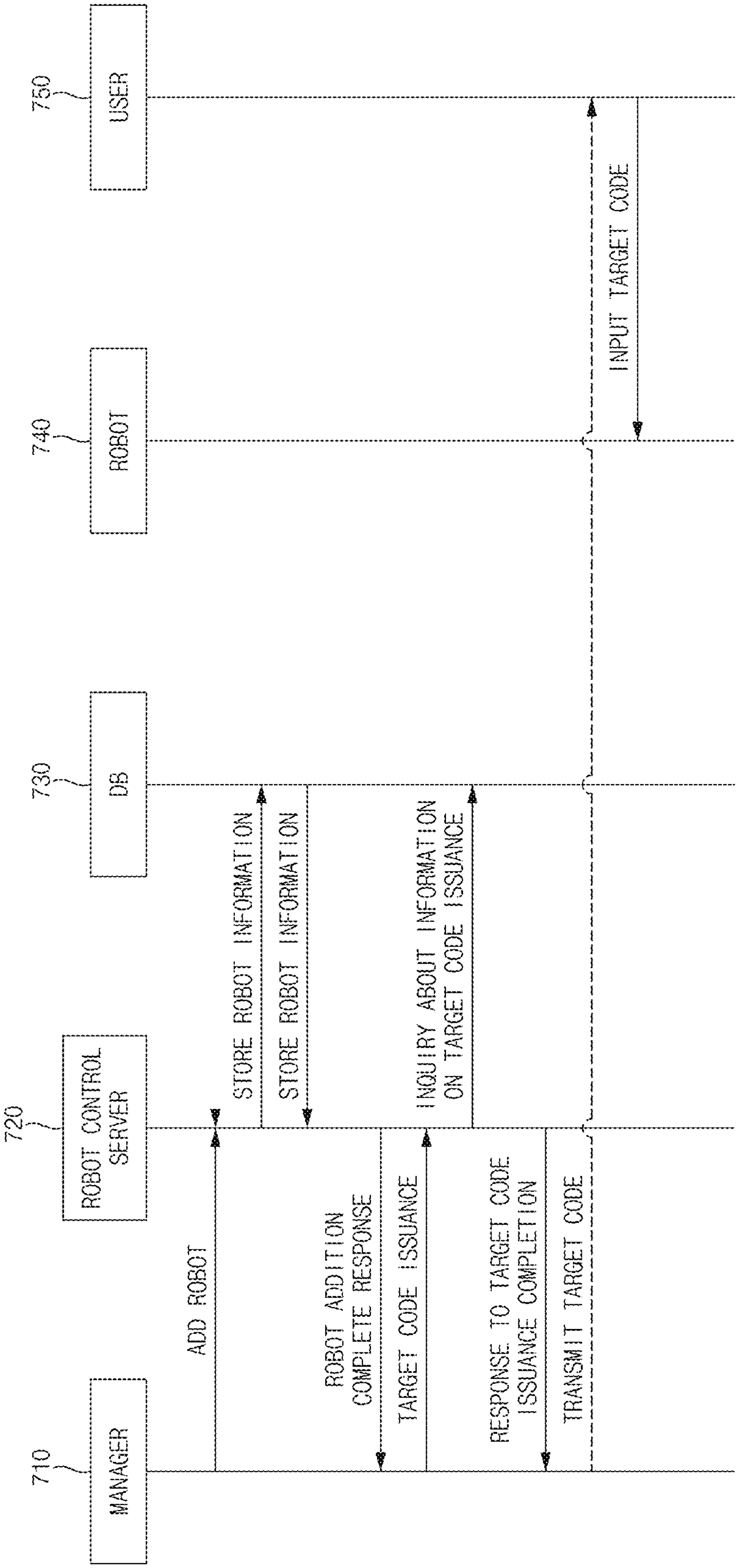
FIG. 7 is a diagram illustrating a method of generating a target code while the connection between the robot and the robot control server is offline in a system for controlling a robot according to an exemplary embodiment of the present disclosure.

FIG. 7 is a diagram illustrating a method of generating a target code while the connection between the robot and the robot control server is offline in a system for controlling a robot according to an exemplary embodiment of the present disclosure.

In a system for controlling a robot (e.g., the system 100 for controlling a robot of FIG. 1) according to an exemplary embodiment of the present disclosure, a manager 710 may add a robot to a robot control server 720. In the instant case, the manager 710 may register basic information such as serial code information of the robot and a MAC address of the robot in the robot control server 720.

The robot control server 720 may store the basic information received from the manager 710 in a DB 730. The robot control server 720 may transmit a response regarding completion of robot addition to the manager 710 based on stored robot information including basic information.

Based on the addition of the robot, the manager 710 may request the robot control server 720 to issue the target code for the added robot (i.e., request issuance). The robot control server 720 may query information related to the target code issuance and generate the target code. Then, the robot control server 720 may transmit the target code to the manager 710.

The user 750 may input the target code into a robot 740 based on receiving the target code. In the instant case, a user 750 may receive the target code from the manager 710 through a tool such as email.

The robot 740 may request the user 750 to input a sub-code based on the target code being input from the user 750. Furthermore, the robot 740 may store the payload and signature based on the input sub-code.

Figure 8:
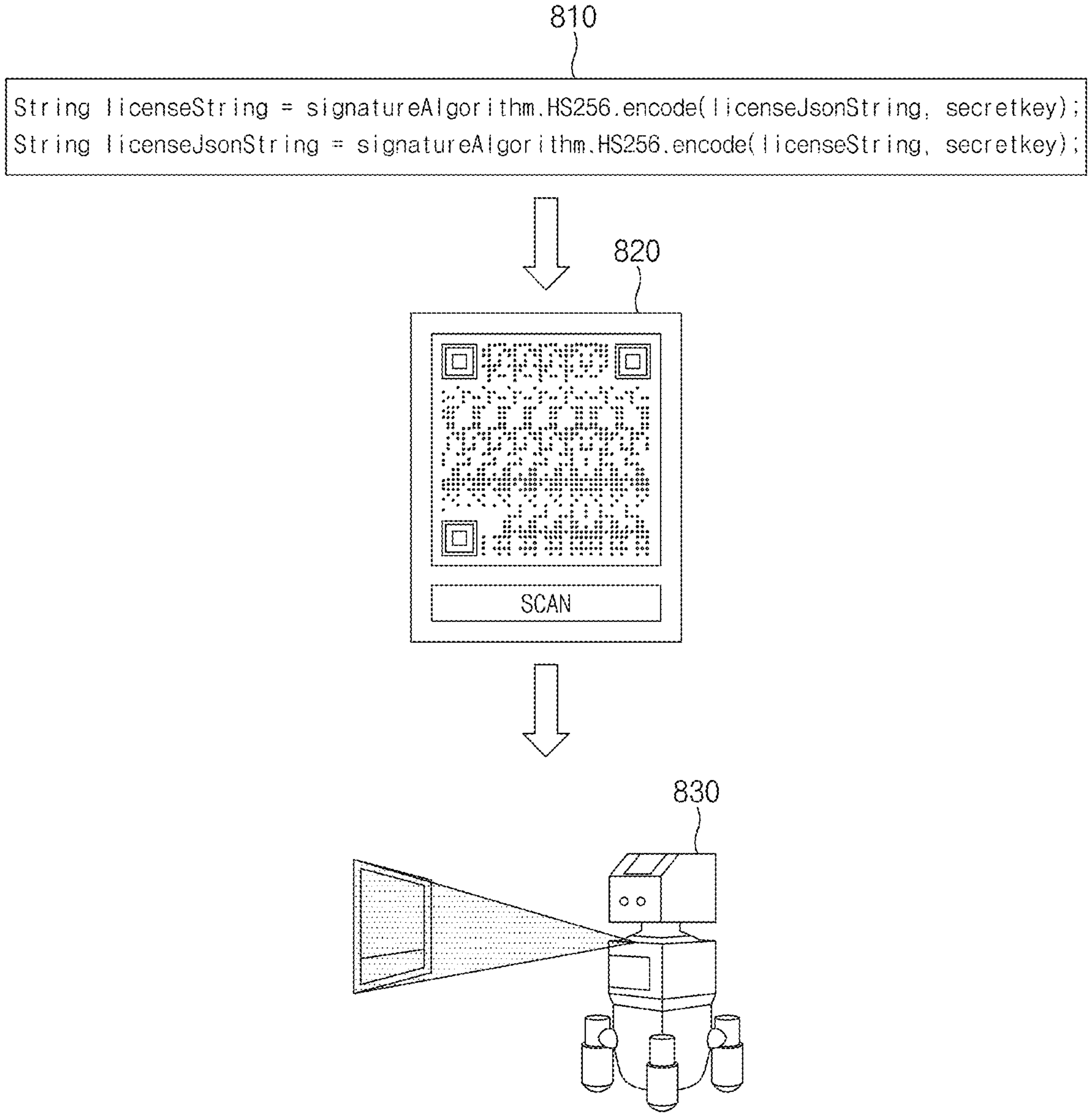
FIG. 8 is a diagram illustrating a process of generating a target code in a system for controlling a robot according to an exemplary embodiment of the present disclosure.

FIG. 8 is a diagram illustrating a process of generating a target code in a system for controlling a robot according to an exemplary embodiment of the present disclosure.

Referring to FIG. 8, a source code 810 may include a first code and a second code for generating a target code 820.

The first code may represent a code that encrypts a payload through a symmetric key. In detail, a robot control server may encrypt the payload by applying the symmetric key and payload to the first code. In the instant case, an example of the encrypted payload may be the target code 820, but the exemplary embodiment of the present disclosure is not limited thereto.

The second code may represent a code that decrypts the payload through the symmetric key. In detail, the robot control server may decrypt the payload by applying the symmetric key and the encrypted payload to the second code.

For reference, with regard to payload, a first payload and a second payload may be described in the present specification. In detail, the first payload may represent the payload of the robot stored in the robot control server. The second payload may represent the robot's payload stored in the robot. Accordingly, depending on where the robot's payload is stored, it may be described as the first payload and/or the second payload.

For example, the target code 820 may be an image of a QR code. The target code 820 may include a payload, and more specifically, may include an encrypted payload. The user may input the target code 820 to the robot 830 through the input device of the robot 830.

Figure 9:
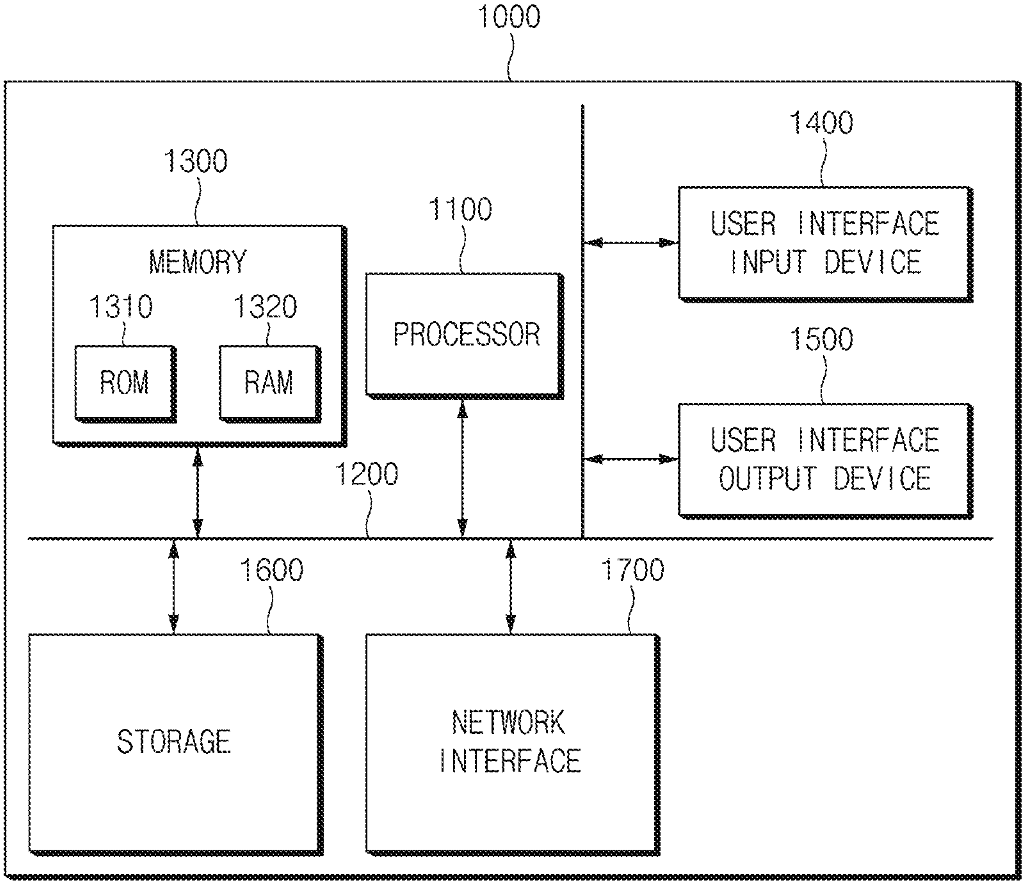
FIG. 9 is a block diagram illustrating a computing system related to a system for controlling a robot or a method of controlling a robot according to an exemplary embodiment of the present disclosure.

FIG. 9 is a block diagram illustrating a computing system related to a system for controlling a robot or a method of controlling a robot according to an exemplary embodiment of the present disclosure.

Referring to FIG. 9, a computing system 1000 related to a system for controlling a robot or a method of controlling a robot may include at least one processor 1100, a memory 1300, a user interface input device 1400, a user interface output device 1500, storage 1600, and a network interface 1700 connected through a bus 1200.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the processes of the method or algorithm described in relation to the exemplary embodiments of the present disclosure may be implemented directly by hardware executed by the processor 1100, a software module or any combination thereof. The software module may reside in a storage medium (that is, the memory 1300 and/or the storage 1600), such as a RAM memory, a flash memory, a ROM memory, an EPROM memory, an EEPROM memory, a register, a hard disk, solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor. The processor and the storage medium may reside in an application specific integrated circuit (ASIC). The ASIC may reside in a user terminal. In another method, the processor and the storage medium may reside in the user terminal as an individual component.

Although embodiments of the present disclosure have been described for illustrative purposes, those skilled in the art will appreciate that various modifications, additions and substitutions are possible, without departing from the scope and spirit of the present disclosure.

The exemplary embodiments described above may be realized by hardware elements, software elements and/or combinations thereof. For example, the devices and components illustrated in the exemplary embodiments of the present disclosure may be implemented in one or more general-use computers or special-purpose computers, such as a processor, a controller, an arithmetic logic unit (ALU), a digital signal processor, a microcomputer, a field programmable gate array (FPGA), a programmable logic unit (PLU), a microprocessor or any device which may execute instructions and respond. A processing unit may operate an operating system (OS) or one or software applications running on the OS. Furthermore, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may include a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes which may be executed by the computer using an interpreter.

The described hardware devices may be configured to act as one or more software modules to perform the operations of the above-described exemplary embodiments of the inventive concept, or vice versa.

The effects of the system for controlling a robot and method according to an exemplary embodiment of the present disclosure will be described below.

According to at least one of the exemplary embodiments of the present disclosure, it is possible to increase work efficiency according to a method and configuration for issuing and managing a target code, such as a digital license for a robot, online by managing a request for issuance of the target code related to an access right to the robot from a user operating the robot.

Furthermore, according to at least one of the exemplary embodiments of the present disclosure, it is possible to ensure stability in the use of a robot depending on the symmetric key issuance method and the encryption method of the target code by generating the target code through a payload containing the characteristics of the robot and a pre-stored symmetric key, Furthermore, according to at least one of the exemplary embodiments of the present disclosure, it is possible to manage the target code issued equally for a robot performing an online service as well as a robot performing a closed-network service by performing the operation to verify the validity of the target code differently depending on the connection state between the robot and the robot control server.

Furthermore, various effects that are directly or indirectly understood through the present disclosure may be provided.

While a few exemplary embodiments have been shown and described with reference to the accompanying drawings, it will be apparent to those skilled in the art that various modifications and variations may be made from the foregoing descriptions. For example, adequate effects may be achieved even if the foregoing processes and methods are conducted in different order than described above, and/or the aforementioned elements, such as systems, structures, devices, or circuits, are combined or coupled in different forms and modes than as described above or be substituted or switched with other components or equivalents.

Thus, it is intended that the present disclosure covers other realizations and other embodiments of the present disclosure provided they come within the scope of the appended claims and their equivalents.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for controlling a robot, the system comprising:
- a robot control server; and
- the robot,
- wherein the robot control server is configured to:
  - receive a request for issuance of a target code related to access authority to the robot from a user operating the robot;
  - determine a connection state between the robot and the robot control server;
  - based on the connection state being a first state corresponding to online, transmit the target code to the user; and
  - based on the connection state being a second state corresponding to offline, transmit the target code and a first sub-code to the user, and
- wherein the robot is configured to:
  - identify the target code input by the user, and
  - receive a command from the user based on validity of the target code being verified.

2. The system of claim 1, wherein the robot control server is further configured to:
- transmit the issuance request to a manager who manages the robot control server based on the issuance request being received from the user; and
- generate the target code based on receiving an approval command regarding the issuance request from the manager.

3. The system of claim 2, wherein the robot control server is further configured to:
- generate a first payload based on at least one of serial code information of the robot, media access control address (MAC address) information of the robot, information related to an operation expiration period of the robot, information related to a model name of the robot, or information related to a providing function of the robot, or a combination thereof based on receiving the approval command; and
- generate the target code based on the first payload and a first symmetric key stored in the robot control server.

4. The system of claim 3, wherein the robot control server is further configured to transmit the first payload and a signature based on receiving a login request from the robot.

5. The system of claim 3, wherein the robot control server is further configured to:
- transmit the target code to the user based on a connection between the robot and the robot control server being in the first state corresponding to the online; and
- transmit the target code and the first sub-code including the first payload to the user based on a connection between the robot and the robot control server being in the second state corresponding to the offline.

6. The system of claim 5, wherein the robot control server is further configured to update information which is different from information related to the robot among information included in the first payload based on the connection between the robot and the robot control server being in the first state.

7. The system of claim 1, wherein the robot is further configured to:
- apply a state of the robot as a failure state based on the verification of the validity of the target code failing; and
- transmit the state of the robot to the user.

8. A system for controlling a robot, the system comprising:
- a robot control server; and
- the robot,
- wherein the robot control server is configured to receive, from a user operating the robot, an issuance request for a target code related to access authority to the robot, and
- wherein the robot is configured to:
  - identify the target code input by the user;
  - identify a second symmetric key from the target code based on receiving the target code from the user through an input device of the robot;
  - determine a connection state between the robot control server and the robot based on identification of the second symmetric key;

based on the connection state being online, verify the validity of the target code by transmitting a login request to the robot control server; and based on the connection state being offline, request the user to input a second sub-code, and verify the validity of the target code based on the second sub-code received from the user; and receive a command from the user based on validity of the target code being verified.

9. The system of claim 8, wherein the robot is further configured to:

transmit a login request based on at least one of a serial code of the robot or a MAC address of the robot, or a combination thereof to the robot control server, based on the connection between the robot and the robot control server being online;

receive a second payload including a signature from the robot control server;

apply the second symmetric key to the second payload to decrypt the second payload; and verify the validity of the target code by identifying at least one of the serial code of the robot, the MAC address of the robot, an operation expiration period of the robot, a model name of the robot, or a provided function of the robot, or a combination thereof from the decrypted second payload.

10. The system of claim 8, wherein the robot is further configured to:

request the user to input the second sub-code from the user based on the connection between the robot and the robot control server being offline;

decrypt the second sub-code by applying the second symmetric key to the second sub-code based on receiving the second sub-code from the user through the input device of the robot; and verify the validity of the target code by identifying at least one of a serial code of the robot, a MAC address of the robot, an operation expiration period of the robot, a model name of the robot, or a provided function of the robot, or a combination thereof from the decrypted second sub-code.

11. A method of controlling a robot, the method comprising:

receiving a request for issuance of a target code related to access authority to the robot from a user operating the robot;

determining a connection state between the robot and a robot control server;

based on the connection state being a first state corresponding to online, transmitting the target code to the user;

based on the connection state being a second state corresponding to offline, transmitting the target code and a first sub-code to the user;

identifying the target code input by the user; and receiving a command from the user based on validity of the target code being verified.

12. The method of claim 11, wherein the receiving of the request for issuance of the target code includes:

transmitting the issuance request to a manager who manages the robot control server based on the issuance request being received from the user; and generating the target code based on receiving an approval command regarding the issuance request from the manager.

13. The method of claim 12, wherein the generating of the target code includes:

generating a first payload based on at least one of serial code information of the robot, media access control address (MAC address) information of the robot, information related to an operation expiration period of the robot, information related to a model name of the robot, or information related to a providing function of the robot, or a combination thereof based on receiving the approval command; and generating the target code based on the first payload and a first symmetric key stored in the robot control server.

14. The method of claim 13, wherein the generating of the target code includes transmitting the first payload and a signature based on receiving a login request from the robot.

15. The method of claim 13, wherein the generating of the target code includes:

transmitting the target code to the user based on a connection between the robot and the robot control server being in the first state corresponding to the online; and transmitting the target code and the first sub-code including the first payload to the user based on a connection between the robot and the robot control server being in the second state corresponding to the offline.

16. The method of claim 15, further including:

updating information which is different from information related to the robot among information included in the first payload based on the connection between the robot and the robot control server being in the first state.

17. The method of claim 11, further including:

identifying a second symmetric key from the target code based on receiving the target code from the user through an input device of the robot;

determining the connection state between the robot control server and the robot based on identification of the second symmetric key; and verifying the validity of the target code based on determination of the connection state.

18. The method of claim 17, wherein the verifying of the validity of the target code includes:

transmitting a login request based on at least one of a serial code of the robot or a MAC address of the robot, or a combination thereof to the robot control server, based on the connection between the robot and the robot control server being online;

receiving a second payload including a signature from the robot control server;

applying the second symmetric key to the second payload to decrypt the second payload; and verifying the validity of the target code by identifying at least one of the serial code of the robot, the MAC address of the robot, an operation expiration period of the robot, a model name of the robot, or a provided function of the robot, or a combination thereof from the decrypted second payload.

19. The method of claim 17, wherein the verifying of the validity of the target code includes:

requesting the user to input the second sub-code from the user based on the connection between the robot and the robot control server being offline;

decrypting the second sub-code by applying the second symmetric key to the second sub-code based on receiving the second sub-code from the user through the input device of the robot; and verifying the validity of the target code by identifying at least one of a serial code of the robot, a MAC address of the robot, an operation expiration period of the robot, a model name of the robot, or a provided function of the robot, or a combination thereof from the decrypted second sub-code.

20. The method of claim 11, further including:

applying a state of the robot as a failure state based on the verification of the validity of the target code failing; and transmitting the state of the robot to the user.

* * * * *